(12) United States Patent
Manoharan et al.

(10) Patent No.: US 10,354,463 B2
(45) Date of Patent: Jul. 16, 2019

(54) SYSTEMS AND METHODS FOR SECURE AUTHENTICATION FOR ACCESS CONTROL, HOME CONTROL, AND ALARM SYSTEMS

(71) Applicant: Honeywell International Inc., Morristown, NJ (US)

(72) Inventors: Sivarajan Manoharan, Chennai (IN); Dinesh Babu Rajamanickam, Thanjavur (IN); Sunil Madhusuthanan, Nagercoil (IN)

(73) Assignee: ADEMCO INC., Golden Valley, MN (US)

( * ) Notice: Subject to any disclaimer, the term of this patent is extended or adjusted under 35 U.S.C. 154(b) by 0 days.

(21) Appl. No.: 15/463,883

(22) Filed: Mar. 20, 2017

(65) Prior Publication Data
US 2018/0268630 A1 Sep. 20, 2018

(51) Int. Cl.
*G07C 9/00* (2006.01)
*H04M 1/725* (2006.01)
(Continued)

(52) U.S. Cl.
CPC .......... *G07C 9/00111* (2013.01); *G06F 21/31* (2013.01); *G07C 9/00174* (2013.01);
(Continued)

(58) Field of Classification Search
CPC ...... G07C 9/00309; G07C 2009/00841; G07C 2009/00865; G07C 9/00015; G07C 9/00142; G07C 2009/00261; G07C 9/00182; G07C 9/00857; G07C 2209/14; G07C 9/00039; G07C 9/00111; G08B 25/008; H04M 1/72583; H04W 4/023; G06Q 20/4012

See application file for complete search history.

(56) References Cited

U.S. PATENT DOCUMENTS

| | | | | |
|---|---|---|---|---|
| 5,805,064 A | * | 9/1998 | Yorkey | G08B 25/008 340/4.3 |
| 6,980,081 B2 | * | 12/2005 | Anderson | G06F 21/36 340/5.51 |

(Continued)

FOREIGN PATENT DOCUMENTS

| | | |
|---|---|---|
| CN | 201853308 U | 6/2011 |
| CN | 103106719 A | 5/2013 |

(Continued)

OTHER PUBLICATIONS

English language translation of abstract for CN201853308 (U).
(Continued)

*Primary Examiner* — Brian E Miller
(74) *Attorney, Agent, or Firm* — Husch Blackwell LLP

(57) ABSTRACT

Systems and methods for secure authentication for access control, home control, and alarm systems are provided. Some methods can include receiving first user input at a mobile device, determining whether the first user input matches preconfigured user input, when the first user input matches the preconfigured user input, transmitting an access signal to an access control system, a home control system, or an alarm system to trigger access thereto.

13 Claims, 1 Drawing Sheet

(51) Int. Cl.
*H04W 4/02* (2018.01)
*G08B 25/00* (2006.01)
*G06F 21/31* (2013.01)

(52) U.S. Cl.
CPC ...... *G08B 25/008* (2013.01); *H04M 1/72583* (2013.01); *H04W 4/023* (2013.01); *G07C 2009/00793* (2013.01); *G07C 2209/63* (2013.01)

(56) References Cited

U.S. PATENT DOCUMENTS

| | | | | |
|---|---|---|---|---|
| 8,165,297 | B2* | 4/2012 | Hoffmann | H04L 9/3271 |
| | | | | 380/256 |
| 8,224,313 | B2* | 7/2012 | Howarter | B60R 25/2009 |
| | | | | 455/414.1 |
| 8,762,714 | B2* | 6/2014 | Hsieh | H04L 9/3271 |
| | | | | 380/256 |
| 8,990,927 | B2* | 3/2015 | Al-Azzawi | G07C 9/00182 |
| | | | | 726/19 |
| 9,280,280 | B2* | 3/2016 | Dearman | H04M 1/72544 |
| 9,396,598 | B2* | 7/2016 | Daniel-Wayman | |
| | | | | G07C 9/00309 |
| 9,503,902 | B1* | 11/2016 | Coney | H04W 12/08 |
| 9,622,399 | B2* | 4/2017 | Kremmer | A01B 59/06 |
| 9,652,907 | B2* | 5/2017 | Geerlings | G08C 17/02 |
| 9,666,005 | B2* | 5/2017 | Ellis | G07C 9/00309 |
| 9,725,069 | B2* | 8/2017 | Krishnan | G07C 9/00817 |
| 2006/0111053 | A1 | 5/2006 | Wu | |
| 2007/0001826 | A1* | 1/2007 | Lanier | B60R 25/04 |
| | | | | 340/425.5 |
| 2007/0197261 | A1* | 8/2007 | Humbel | G06Q 30/00 |
| | | | | 455/558 |
| 2008/0034422 | A1 | 2/2008 | Al-Azzawi | |
| 2015/0102898 | A1* | 4/2015 | Huennekens | G07C 9/00111 |
| | | | | 340/5.6 |
| 2015/0287256 | A1* | 10/2015 | Davis | G05B 19/02 |
| | | | | 340/5.25 |
| 2015/0373022 | A1* | 12/2015 | Dubman | H04L 63/10 |
| | | | | 726/3 |
| 2016/0028730 | A1 | 1/2016 | Natarajan et al. | |
| 2016/0192190 | A1* | 6/2016 | Hartley | H04W 12/06 |
| | | | | 709/225 |
| 2016/0335819 | A1 | 11/2016 | Lingan et al. | |
| 2017/0053465 | A1 | 2/2017 | Wu et al. | |
| 2017/0103632 | A1* | 4/2017 | Tolle | G08B 13/2454 |
| 2017/0249794 | A1* | 8/2017 | Davis | G07C 9/00857 |

FOREIGN PATENT DOCUMENTS

| | | |
|---|---|---|
| CN | 104851168 A | 8/2015 |
| CN | 105025244 A | 11/2015 |
| KR | 10-0648047 | 11/2006 |
| WO | WO 00/35178 | 6/2000 |

OTHER PUBLICATIONS

English language translation of abstract and bibliographic information for CN103106719A.

English language translation of abstract and bibliographic information for CN104851168 (A).

English language translation of abstract and bibliographic information for CN105025244 (A).

English language translation of bibliographic information for KR 100648047 (B1).

Extended European search report for corresponding EP patent application 18155936.0, dated Jul. 19, 2018.

* cited by examiner

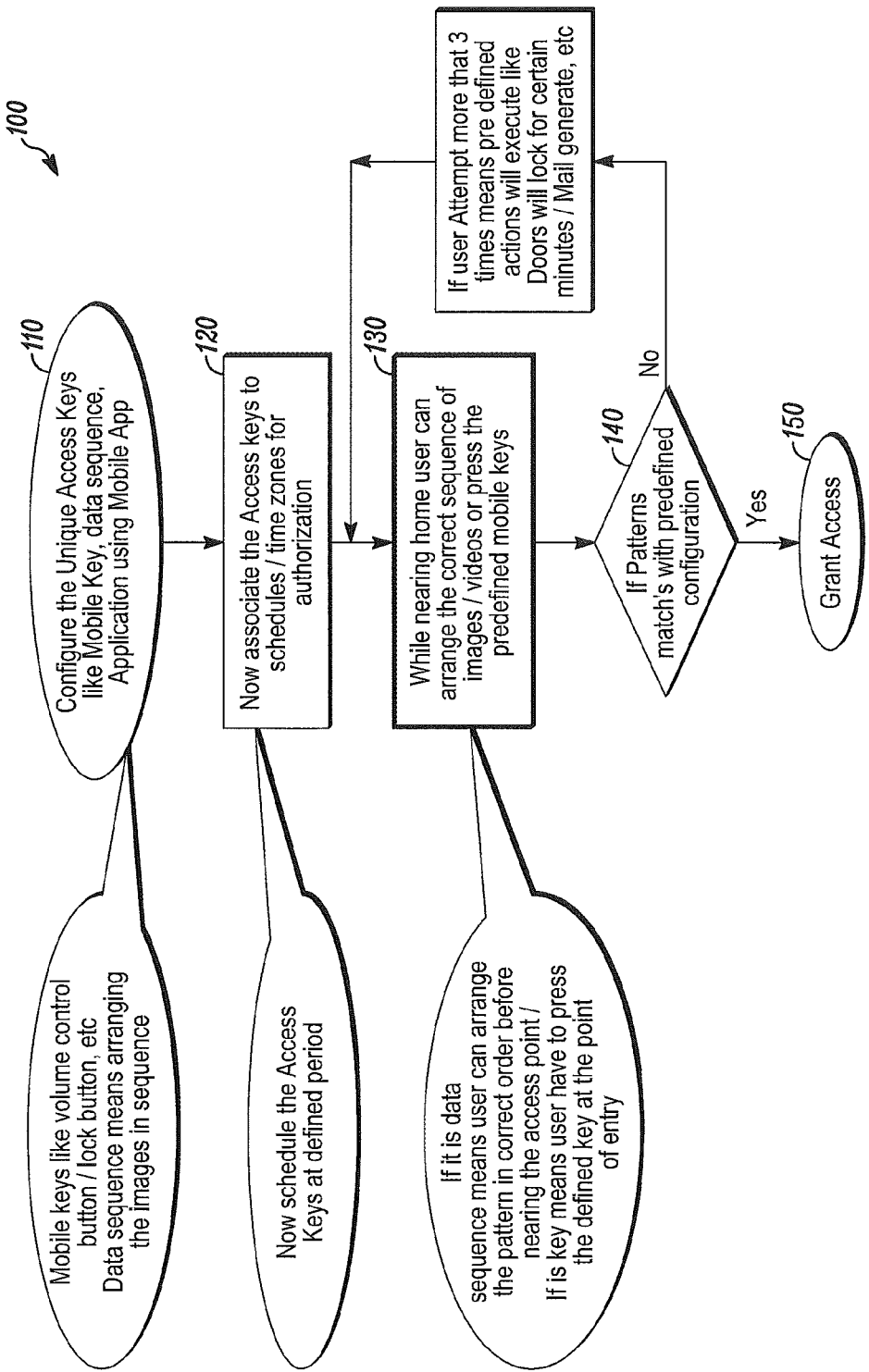

SYSTEMS AND METHODS FOR SECURE AUTHENTICATION FOR ACCESS CONTROL, HOME CONTROL, AND ALARM SYSTEMS

FIELD

The present invention relates generally to access control systems. More particularly, the present invention relates to systems and methods for secure authentication for access control, home control, and alarm systems.

BACKGROUND

Some known access control, home control, and alarm systems use card-based authentication to authenticate a user. For example, some known systems authenticate a user based on a manual swipe of an access card at a card reader. However, an access card can be stolen and used by an unauthorized user to access secured premises.

Some known access control, home control, and alarm systems use pin or pattern based authentication to authenticate a user. For example, some known systems authenticate a user based on a pin number entered into a keypad. However, an unauthorized user can view a keypad while an authorized user enters a pin number and thereafter use the same pin number to gain access to secured premises.

Some known access control, home control, and alarm systems use mobile device based authentication to authenticate a user. For example, some known access control systems authenticate a user based on an NFC signal received from the user's mobile device. However, an unauthorized user can steal an authorized user's mobile device and use the stolen mobile device to gain access to secured premises. Indeed, known systems do not verify that the authorized user is in possession of the mobile device before transmitting an NFC signal triggering access to the access control, home control, or alarm system.

In view of the above, there is a continuing, ongoing need for improved systems and methods.

BRIEF DESCRIPTION OF THE DRAWINGS

FIG. 1 is a flow diagram of a method in accordance with disclosed embodiments.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for secure authentication for access control, home control, and alarm systems. For example, some systems and methods disclosed herein can receive user input at a user's mobile device and, responsive thereto, transmit an access signal from the mobile device to an access control, home control, or alarm system for obtaining access thereto. In some embodiments, the access signal can trigger access to secured premises, can trigger access to or turn on connected home devices, or can arm or disarm a panel or zone of an alarm system.

In some embodiments, the user input received by the mobile device can include the user depressing and holding down one or mobile buttons, such as a volume button, a lock button, or a power button, on the exterior surface of the user's mobile device in a preconfigured sequence and/or simultaneously. In some embodiments, the user input received by the mobile device can include the user adjusting mobile keys or settings of the user's mobile device, such as volume percentage or brightness percentage, to a preconfigured level. In some embodiments, the user input received by the mobile device can include the user arranging data, such as images or video, displayed by a mobile application executing on the user's mobile device in a preconfigured sequence or order. In some embodiments, the user input received by the user device can include one or more of the above-identified user input in a preconfigured combination.

In accordance with disclosed embodiments, the user input described above and herein can be preconfigured by a user and associated with access to one or more of a defined access point, access control system, home control system, or alarm system located at or within one or more defined geographic locations and for use within one or more defined time periods. Accordingly, while user input can trigger access to one system located at one location at one time, the same user input can fail to trigger access to the same system located at the same location, but at a different time.

In some embodiments, a user can change the preconfigured user input that triggers access on an as needed basis by preconfiguring new user input and associating the new user input with access to one or more of a defined access point, access control system, home control system, or alarm system located at or within one or more defined geographic locations and for use within one or more defined time periods.

In some embodiments, a user can provide a visitor with access to a limited portion of a system or a limited geographic area for a limited number of times or for a limited time period. For example, the user can preconfigure the user input described above and herein and associate the same with access to the limited portion of the system or the limited geographic area or for the limited number of times or for the limited time period. After the visitor obtains access the limited number of times of after expiration of the limited time period, access can revoked so that the user input fails to trigger access thereafter.

In accordance with disclosed embodiments, a user's mobile device can receive the user input disclosed and described above and herein before or when the user arrives at an access point of an access control system or a region in which an access control system, home control system, alarm system is located, while the user is approaching the access point of the access control system or the region in which the access control system, home control system, or alarm system is located, or when the user is within or outside of a predetermined distance of the access point of the access control system or the region in which the access control system, home control system, or alarm system is located. Then, upon detecting the user input, the mobile device can transmit an access signal to the access point or a control panel of or a central communication station in communication with the access control system, the home control system, or the alarm system to trigger access thereto. However, absent the preconfigured user input or upon receiving user input that does not match the preconfigured user input, the mobile device can refrain from transmitting the access signal to the access point, access control system, home control system, or alarm system.

In accordance with the above, it is to be understood that the mobile device can execute a mobile application thereon that can recognize received user input, determine whether the received user input matches preconfigured user input, and, responsive thereto, cause the mobile device to transmit the access signal to the access point, access control system, home control system, or alarm system.

FIG. 1 is a flow diagram of a method 100 in accordance with disclosed embodiments. As seen in FIG. 1, the method 100 can include configuring one or more access keys, such as, for example, mobile buttons or keys, or configuring a data sequence with a defined sequence, level, or order as in 110 and associating the configured access keys or data sequence with access to one or more locations during one or more time periods or zones, or the like for authentication as in 120.

After preconfiguration as in 110 and 120, the method 100 can include receiving user input into a mobile device, such as depressing the access keys or arranging the data sequence, as in 130. Then, the method 100 can include determining whether the received user input matches preconfigured user input as in 140. For example, the method can determine whether the received user input matches the sequence level or order of access keys or data sequences configured as in 110, whether the mobile device is in, proximate to, or within a predetermined distance from the location identified as in 120, and whether the current time is within the time period or zone identified as in 120. If yes, then the method 100 can include granting access as in 150. For example, the method 100 can include transmitting an access signal to trigger access to an associated system.

However, when the method 100 determines that the received user input does not match the preconfigured user input as in 140, the method 100 can include continuing to receive user input as in 130. For example, the method 100 can continue receiving user input when the received user input does not match the sequence level or order of access keys or data sequences configured as in 110, when the mobile device is not in or proximate to or is outside of the predetermined distance from the location identified as in 120, or when the current time is outside of the time period or zone identified as in 120. In some embodiments, when the method 100 determines that the received user input does not match the preconfigured user input a predetermined number of times, the method 100 can include executing a predefined alternate action, such as, for example, transmitting a signal to lock doors to a secured or monitored premises for a predetermined period of time or transmitting a signal to a user, a third party, or the like.

It is to be understood that the systems and methods as disclosed and described above can be implemented on a mobile device with a transceiver device and a memory device in communication with control circuitry, one or more programmable processors, and executable control software as would be understood by one of ordinary skill in the art, for example, the mobile application disclosed and described above. In some embodiments, the transceiver device can communicate with an access point, an access control system, a home control system, or an alarm system, and in some embodiments, the transceiver device can communicate with a cloud server. In some embodiments, the memory device can store the preconfigured access keys or data sequence disclosed and described above. In some embodiments, the executable control software can be stored on a transitory or non-transitory computer readable medium, including, but not limited to, local computer memory, RAM, optical storage media, magnetic storage media, flash memory, and the like, and some or all of the control circuitry, the programmable processors, and the control software can execute and control at least some of the methods disclosed and described above.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
    receiving instructions from a user for preconfiguring or changing preconfigured user input to associate the preconfigured user input with user access to an access control system, a home control system, or an alarm system;
    receiving first user input at a mobile device;
    determining whether the first user input matches the preconfigured user input;
    when the first user input matches the preconfigured user input, transmitting an access signal to the access control system, the home control system, or the alarm system to trigger the user access thereto;
    determining when the preconfigured user input has been used a limited number of times to provide access to the access control system, the home control system, or the alarm system; and
    when the preconfigured user input has been used the limited number of times to provide the access to the access control system, the home control system, or the alarm system, revoking future access to the access control system, the home control system, or the alarm system based on the preconfigured user input.

2. The method of claim 1 wherein the access signal includes instructions to open or unlock a door monitored by the access control system.

3. The method of claim 1 wherein the access signal includes instructions to turn on a connected device of the home control system.

4. The method of claim 1 wherein the access signal includes instructions to arm or disarm the alarm system.

5. The method of claim 1 wherein the first user input includes a user depressing or holding down one or more mobile buttons of the mobile device in a first sequence.

6. The method of claim 5 wherein determining whether the first user input matches the preconfigured user input includes determining whether the first sequence matches a preconfigured sequence.

7. The method of claim 1 wherein determining whether the first user input matches the preconfigured user input includes determining whether the mobile device is within a predetermined distance of the access control system, the home control system, or the alarm system.

8. The method of claim 1 wherein determining whether the first user input matches the preconfigured user input includes determining whether the first user input is received at a current time that matches a preconfigured time.

9. The method of claim 1 wherein transmitting the access signal to the access control system, the home control system, or the alarm system includes transmitting the access signal to an access point of the access control system or to a control panel of or a central monitoring station in communication with the access control system, the home control system, or the alarm system.

10. A system comprising:
a mobile device; and
an access control system, a home control system, or an alarm system;
wherein the mobile device receives instructions from a user for preconfiguring or changing preconfigured user input to associate the preconfigured user input with user access to the access control system, the home control system, or the alarm system,
wherein the mobile device receives first user input,
wherein the mobile device determines whether the first user input matches the preconfigured user input,
wherein, when the first user input matches the preconfigured user input, the mobile device transmits an access signal to the access control system, the home control system, or the alarm system to trigger the user access thereto,
wherein the mobile device determines when the preconfigured user input has been used a limited number of times to provide access to the access control system, the home control system, or the alarm system, and
wherein, when the preconfigured user input has been used the limited number of times to provide the access to the access control system, the home control system, or the alarm system, the mobile device revokes future access to the access control system, the home control system, or the alarm system based on the preconfigured user input.

11. The system of claim 10 wherein the access signal includes instructions to open or unlock a door monitored by the access control system, to turn on a connected device of the home control system, or to arm or disarm the alarm system.

12. The system of claim 10 wherein the first user input includes a user depressing or holding down one or more mobile buttons of the mobile device in a first sequence, and wherein the mobile device determining whether the first user input matches the preconfigured user input includes determining whether the first sequence matches a preconfigured sequence.

13. The system of claim 10 wherein the mobile device determining whether the first user input matches the preconfigured user input includes determining whether the mobile device is within a predetermined distance of the access control system, the home control system, or the alarm system or determining whether the first user input is received at a current time that matches a preconfigured time.

* * * * *